(12) United States Patent
Rodriguez et al.

(10) Patent No.: US 8,508,406 B2
(45) Date of Patent: Aug. 13, 2013

(54) POSITION ESTIMATION ENHANCEMENT FOR A GLOBAL NAVIGATION SATELLITE SYSTEM RECEIVER

(75) Inventors: Filippo Rodriguez, Rome (IT); Gian Paolo Plaia, Rome (IT)

(73) Assignee: Telespazio S.p.A., Rome (IT)

(*) Notice: Subject to any disclaimer, the term of this patent is extended or adjusted under 35 U.S.C. 154(b) by 317 days.

(21) Appl. No.: 12/933,279

(22) PCT Filed: Mar. 20, 2008

(86) PCT No.: PCT/EP2008/053420
§ 371 (c)(1),
(2), (4) Date: Dec. 13, 2010

(87) PCT Pub. No.: WO2009/115130
PCT Pub. Date: Sep. 24, 2009

(65) Prior Publication Data
US 2011/0090117 A1    Apr. 21, 2011

(51) Int. Cl.
*G01S 19/22*    (2010.01)
(52) U.S. Cl.
USPC .................................................... 342/357.61
(58) Field of Classification Search
USPC .................................... 342/357.61, 357.59
IPC .................. G01S 19/428, 19/21, 19/215, 19/22
See application file for complete search history.

(56) References Cited

U.S. PATENT DOCUMENTS

| | | | | |
|---|---|---|---|---|
| 5,663,734 A | * | 9/1997 | Krasner | 342/357.64 |
| 6,067,484 A | * | 5/2000 | Rowson et al. | 342/357.59 |
| 6,313,789 B1 | * | 11/2001 | Zhodzishsky et al. | 342/357.68 |
| 2006/0012523 A1 | | 1/2006 | Schmid et al. | 342/451 |

FOREIGN PATENT DOCUMENTS

WO    WO 2004/036240    4/2004

OTHER PUBLICATIONS

E. Del Re et al. (editors), Satellite Personal Communications for Future-Generation Systems, Springer-Verlag, p. 137, 2002.*
International Search Report and Written Opinion for PCT/EP2008/053420 filed Mar. 20, 2008; 9 pages.

* cited by examiner

*Primary Examiner* — Jack W Keith
*Assistant Examiner* — Fred H Mull
(74) *Attorney, Agent, or Firm* — Westman, Champlin & Kelly, P.A.

(57) ABSTRACT

A method of estimating a position of a satellite receiver, comprising computing a weight matrix, and computing an estimated position of the satellite receiver based on the weight matrix, wherein computing the weight matrix includes computing quantities indicative of degradations experienced by satellite signals and of multipath interference, and computing the weight matrix based on the computed quantities.

11 Claims, 6 Drawing Sheets

FIG. 6

|  | CNR<17dB | 17<=CNR<21dB | CNR=21dB | 22<=CNR<24dB | CNR=24dB | CNR=25dB | 26<=CNR<30dB | CNR>=30dB |
|---|---|---|---|---|---|---|---|---|
| 0-10 degrees | 1.0/2000 | 1.0/1200 | 1.0/1000 | 1.0/1000 | 1.0/1000 | 1.0/1000 | 1.0/1000 | 1.0/1000 |
| 10-20 degrees | 1.0/1900 | 1.0/2100 | 1.0/1900 | 1.0/1500 | 1.0/1900 | 1.0/1900 | 1.0/1900 | 1.0/1900 |
| 20-40 degrees | 0.0 | 1.0/150 | 1.0/150 | 1.0/150 | 1.0/100 | 1.0/150 | 1.0/250 | 0.0 |
| 40-60 degrees | 0.0 | 0.0 | 0.0 | 0.0 | 1.0/250 | 1.0/450 | 1.0/250 | 1.0/500 |
| 60-90 degrees | 0.0 | 0.0 | 0.0 | 0.0 | 1.0/250 | 1.0/200 | 1.0/250 | 1.0/500 |

FIG. 7

|  | No weighting | | Known weighting | | Enhanced position estimation | |
|---|---|---|---|---|---|---|
|  | Mean [m] | Variance [m²] | Mean [m] | Variance [m²] | Mean [m] | Variance [m²] |
| East Error: | 3.355434 | 72.43606 | 3.681388 | 30.03144 | 2.865134 | 20.74419 |
| North Error: | -1.67571 | 212.1758 | -1.07535 | 97.30971 | 1.389936 | 68.18075 |
| Altitude Error: | 42.91204 | 280.1023 | 41.87515 | 172.7288 | 37.81853 | 178.426 |

POSITION ESTIMATION ENHANCEMENT FOR A GLOBAL NAVIGATION SATELLITE SYSTEM RECEIVER

CROSS-REFERENCE TO RELATED APPLICATION

This Application is a Section 371 National Stage Application of International Application No. PCT/EP2008/053420, filed Mar. 20, 2008 and published as WO/2009/115130 on Sep. 24, 2009, in English, the contents of which are hereby incorporated by reference in their entirety.

FIELD OF THE INVENTION

The present invention relates in general to satellite navigation systems, and more in particular to position estimation enhancements for a global navigation satellite system (GNSS) receiver.

BACKGROUND OF THE INVENTION

FIG. 1 shows schematically a Global Navigation Satellite System (GNSS) 1 comprising a plurality of satellites 4 emitting signals directed to a plurality of receivers 2 and local elements 3 (only one of which is shown in FIG. 1), communicating with each other in a manner known per se and hence not described in detail. Each receiver 2 is generally enclosed in a corresponding user terminal configured to execute high level software applications based on the data provided by the receiver 2. From a technical point of view, each receiver 2 may be regarded as a radio-frequency (RF) front-end of the corresponding user terminal, namely the networking part of the user terminal, as opposed to the application part, comprising a user interface and the aforementioned high level applications.

Each satellite 4 transmits signals modulated by a pseudo-random sequence (PN sequence) characteristic of the satellite 4. Furthermore, signals emitted by each satellite 4 contain a navigation message, in turn containing, besides data suited to improve the accuracy in the calculation of the receiver position, the ephemeris of the satellite, namely mathematical functions describing the satellite orbit in a highly precise manner. Therefore, based on the information carried by the signals, each receiver 2 computes its distance from the satellite 4. In particular, the receiver 2 computes the propagation time of the signal from the satellite 4 to the receiver 2, namely the time difference between the emission time, that is the time at which the satellite 4 emits the signal, and the reception time, that is the time at which the receiver 2 receives the same signal. Afterwards, an approximate estimate of the satellite-receiver distance is obtained by multiplying the propagation time by the light speed; such an approximate estimate of the satellite-receiver distance is known as pseudorange. Pseudoranges related to different satellites (generally, at least four satellites, as shown in FIG. 2) are then used to compute an estimate of the receiver position, as it will be explained below in more detail.

In some cases, upon having determined the pseudoranges, instead of computing an estimate of its position, the receiver 2 sends the pseudoranges to a local element 3, which is in charge of computing the estimate of the receiver position, and sending the estimation back to the receiver 2. In particular GNSSs, generally known as Assisted Global Navigation Satellite Systems (A-GNSSs), the satellite ephemeris are provided to the receiver 2 by the local elements 3, so that the receiver 2 does not have to extract them from the navigation messages. Based on the pseudoranges and the received ephemeris, the receiver 2 computes an estimate of its position. In particular A-GNSSs, generally known as A-GNSS "User Equipment Assisted", the receiver 2 just computes estimates of the pseudoranges and send them to a local element 3, which is in charge of all the remaining operations (solving ambiguities in fractional pseudorange measurements, computing the position, . . . ).

More in detail, the receiver position, represented by a position vector, is computed by means of N pseudoranges related to N corresponding satellites, whose signals are received by the receiver 2. Nevertheless, it has to be noted that a pseudorange is the distance between the position of the corresponding satellite 4 at the transmission time and the position of the receiver 2 at the reception time. Because the satellite clock and the receiver clock are not perfectly synchronized, it is impossible to compute the exact distance between a satellite 4 and a receiver 2.

Neglecting errors induced by propagation, multipath interferences and receiver errors, the basic definition of the pseudorange $\rho^j$ relative to the j-th satellite is:

$$\rho^j = R^j + c \cdot (\delta^j - \delta) \quad (1)$$

$$R^j = f(X, Y, Z) = \sqrt{(X^j(t)-X)^2 + (Y^j(t)-Y)^2 + (Z^j(t)-Z)^2} \quad (2)$$

wherein:
- $X^j, Y^j, Z^j$ are the j-th satellite position coordinates;
- $X, Y, Z$ are the receiver position coordinates;
- $c$ is the light speed;
- $\delta^j$ and $\delta$ are respectively, the j-th satellite clock offset and the receiver clock offset; and
- $R^j$ is the geometric distance between the j-th satellite and the receiver 2, and is a function of the time, as well as the pseudorange $\rho^j$ (with $R^j$ computed at the transmission time).

The coordinates $X, Y, Z$ of the receiver position form the aforementioned receiver position vector, hereinafter indicated by $[X, Y, z]$. The same applies to the coordinates $X^j, Y^j, Z^j$ of the j-th satellite position, whose position vector is hereinafter indicated by $[X^j, Y^j, Z^j]$.

Starting from equation (1), the receiver position vector $[X,Y,Z]$, which is an unknown quantity, may be computed based on the computed pseudoranges $R^j$, the satellite position vector $[X^j, Y^j, Z^j]$, and the satellite clock offset $\delta^j$. In particular, the satellite position vector $[X^j, Y^j, Z^j]$ is computed based on the transmission time, which is the difference between the reception time and the propagation time, and the received ephemeris, while the satellite clock offset $\delta^j$ is computed using correction parameters included in the navigation message.

The relationship between the computed pseudoranges, also known as observables, and the receiver position is not linear, as shown by equation (1), therefore known techniques are employed to obtain a linearized equation. According to said known techniques, an approximate receiver position is assumed, thus an approximate receiver position vector $[X_0, Y_0, Z_0]$ is chosen. This assumption implies that the receiver position can be regarded as a sum of the approximate receiver position and an adjustment factor. From a vectorial point of view, the receiver position vector $[X, Y, Z]$ is the sum of the approximate receiver position vector $[X_0, Y_0, Z_0]$ and an adjustment vector $[\Delta X, \Delta Y, \Delta Z]$. Because of this assumption, the unknown quantities to be computed are the components $\Delta X, \Delta Y$ and $\Delta Z$ of the adjustment vector $[\Delta X, \Delta Y, \Delta Z]$, as well as the satellite clock offset $\delta$.

In order to compute the unknown quantities $\Delta X, \Delta Y, \Delta Z$ and $\delta$, equation (1) is expanded in a Taylor's series truncated after the linear terms and centered around the approximate receiver position vector $[X_0, Y_0, Z_0]$, so obtaining:

$$\rho^j - R_0^j - c \cdot \delta^j = \tag{3}$$
$$-\frac{X^j(t) - X_0}{R_0^j} \cdot \Delta X - \frac{Y^j(t) - Y_0}{R_0^j} \cdot \Delta Y - \frac{Z^j(t) - Z_0}{R_0^j} \cdot \Delta Z - c \cdot \delta$$

$$R_0^j = f(X_0, Y_0, Z_0) \tag{4}$$
$$= \sqrt{(X^j(t) - X_0)^2 + (Y^j(t) - Y_0)^2 + (Z^j(t) - Z_0)^2}$$

In equation (3), all the unknown quantities ($\Delta X$, $\Delta Y$, $\Delta Z$ and $\delta$) are on the right hand of the equation, whereas the left hand is known. Because of the presence of four unknown quantities, in order to compute the receiver position is necessary to have at least four equations, that is it is necessary to receive signals from at least four satellites, so as to compute the corresponding pseudoranges. Generally, the number N of satellites, the signals of which are received by a receiver, ranges from four to twelve, depending on the satellite constellation geometry and on the receiver position, leading to a system of equations having more equations than unknown quantities, thus being apparently overdetermined. In reality, the observables are affected by errors and noise, therefore the system is not-consistent. This apparent inconsistency is resolved by means of the introduction of a noise vector $\underline{e}$, leading to the following linearized pseudorange equation system:

$$\underline{y} = \underline{G} \cdot \underline{X} + \underline{e} \tag{5}$$

wherein:
  $\underline{X}$ is a vector $[\Delta X\ \Delta Y\ \Delta Z\ \delta]$ containing the coordinates of the adjustment vector $[\Delta X, \Delta Y, \Delta Z]$ associated with the approximate receiver position vector $[X_0, Y_0, Z_0]$, which represents the centre of the Taylor's series, as well as the receiver clock offset $\delta$;
  $\underline{G}$ is a matrix having four columns and N rows, each row being associated with a corresponding satellite, the signal of which are received by the receiver;
  $\underline{y}$ is a N-dimension vector containing the N pseudoranges, each deducted of the corresponding geometric distance $\rho^j$ between the corresponding satellite and the receiver, thus depending on the approximate receiver position; and
  the noise vector $\underline{e}$ is an N-dimension vector containing the errors of the components of the vector $\underline{y}$.

It is possible to demonstrate that each row of the matrix $\underline{G}$ can be expressed as:

$$G_i = [\cos El_i \cos Az_1\ \cos El_i \cos Az_i\ \sin El_i\ 1] \tag{6}$$

According to equation (6), each row of the matrix $\underline{G}$ depends on the elevation $El_i$ and the azimuth $Az_i$ of the corresponding i-th satellite, namely on the receiver and satellite positions, the satellite position being a known quantity either from the ephemeris or the data contained in the navigation messages.

In known GNSSs, equation system (5) is used to iteratively compute estimates $\hat{\underline{X}}$ of vector $\underline{X}$. In fact, by arbitrarily choosing an approximate receiver position, namely an approximate receiver position vector $[X_0, Y_0, Z_0]$, it possible to compute a corresponding approximation $\tilde{\underline{y}}$ of the vector $\underline{y}$, as well as an approximation $\tilde{\underline{G}}$ of the matrix $\underline{G}$. Afterwards, starting from the equation system (5) and neglecting the vector $\underline{e}$, the equation system $\tilde{\underline{G}} \cdot \hat{\underline{X}} = \tilde{\underline{y}}$ may be solved and a first estimate $\hat{\underline{X}}$ of the vector $\underline{X} = [\overline{\Delta X}\ \overline{\Delta Y}\ \Delta Z\ \delta]$ so computed, which computation involves the computation of an estimated receiver position vector $[X_1, Y_1, Z_1]$. In fact, the estimated receiver position vector $[X_1, Y_1, Z_1]$ is given by the sum of the approximate receiver position vector $[X_0, Y_0, Z_0]$ and the adjustment vector $[\Delta X\ \Delta Y\ \Delta Z]$, formed by the first three components of the computed vector $\underline{X}$.

Afterwards, the estimated receiver position vector $[X_1, Y_1, Z_1]$ is used as a new approximate receiver position for the subsequent iteration in the computation of the estimate $\hat{\underline{X}}$ of the vector $\underline{X}$. Based on the new approximate receiver position, a new approximate vector $\tilde{\underline{y}}$ of the vector $\underline{y}$ and a new approximation $\tilde{\underline{G}}$ of the matrix $\underline{G}$ are computed, so as to compute a new estimate $\hat{\underline{X}}$ of the vector $\underline{X}$, and, consequently, a new estimate of the receiver position, by solving again the equation system $\tilde{\underline{G}} \cdot \hat{\underline{S}} = \tilde{\underline{y}}$. The described sequence of operations is then iterated until the difference between to consecutive estimates $\hat{\underline{X}}$ of the vector $\underline{X}$ is less than a predetermined threshold.

More in detail, the equation system $G\tilde{G} \cdot \hat{\underline{S}} = \tilde{\underline{y}}$ is solved by means of the least squares method, which uses the generalized inverse of the approximation $\tilde{\underline{G}}$ of the matrix $\underline{G}$ and leads to the equation:

$$\hat{\underline{X}} = \text{generalised inverse of } \tilde{\underline{G}} \cdot \tilde{\underline{y}} = (\tilde{\underline{G}}^T \cdot \tilde{\underline{G}})^{-1} \cdot \tilde{\underline{G}}^T \cdot \tilde{\underline{y}} \tag{7}$$

wherein $\tilde{G}^T$ is the transpose matrix of the matrix $\tilde{\underline{G}}$, and the apex $-1$ indicates the inverse of the matrix it refers to.

From the foregoing, it may be appreciated that the receiver position vector $[X, Y, Z]$ depends on the computed pseudoranges $\rho^j$, contained in the vector $\underline{y}$ and in the corresponding approximate vectors $\tilde{\underline{y}}$. Since pseudoranges related to different satellites are affected by errors to different extents, each pseudorange is computed with a different accuracy degree, which affects the computation of the receiver position.

In order to improve the accuracy of the computed receiver position, the provision of a weight matrix in the computation of the receiver position has been recently proposed. For example, US2003/0036849 A1 discloses a track model constraint for GPS position wherein a diagonal pseudorange observation weight matrix is disclosed with diagonal entries which are the reciprocal of the variance entries of the pseudoranges.

OBJECT AND SUMMARY OF THE INVENTION

The Applicant has noted that from an architectural point of view, the solution proposed in the aforementioned patent application requires the provision of differential stations to correct the pseudoranges and to support the phase ambiguity estimation.

The Applicant has also noted that from a computational point of view, the solution proposed in the aforementioned patent application involves a computationally-intensive computation of the individual entries of the weight matrix based on geographical information of the territory on which the receiver is placed, which geographical information is retrieved via altimetric and photographical surveys.

Therefore, an objective of the present invention is to devise a lighter computation methodology for the entries of the weight matrix, which methodology allows an enhanced receiver position to be estimated.

These and other objectives are achieved by the present invention in that it relates to a method, a system and a software product, as defined in the appended claims.

DESCRIPTION OF THE DRAWINGS

The present invention is now described with reference to a non-limitative example and to the enclosed drawings, wherein:

FIG. 6 shows a lookup table according to the present invention.

FIG. 7 shows a comparison in terms of topocentric errors between the present invention and known techniques.

DETAILED DESCRIPTION OF THE INVENTION

Figure 1:
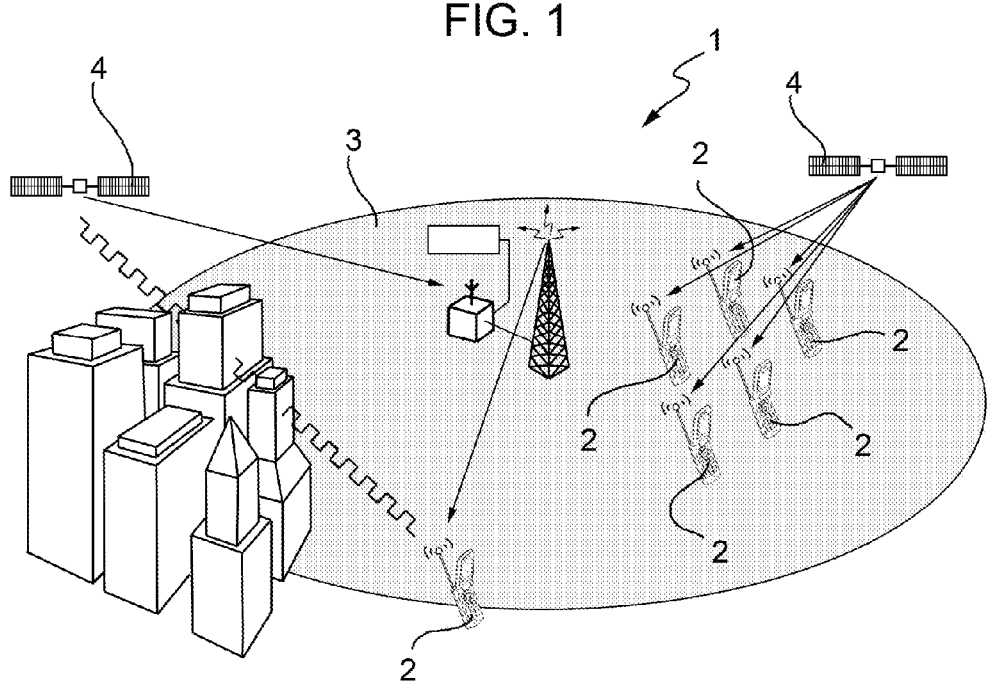
FIG. 1 depicts an assisted global navigation satellite system (A-GNSS)
Figure 2:
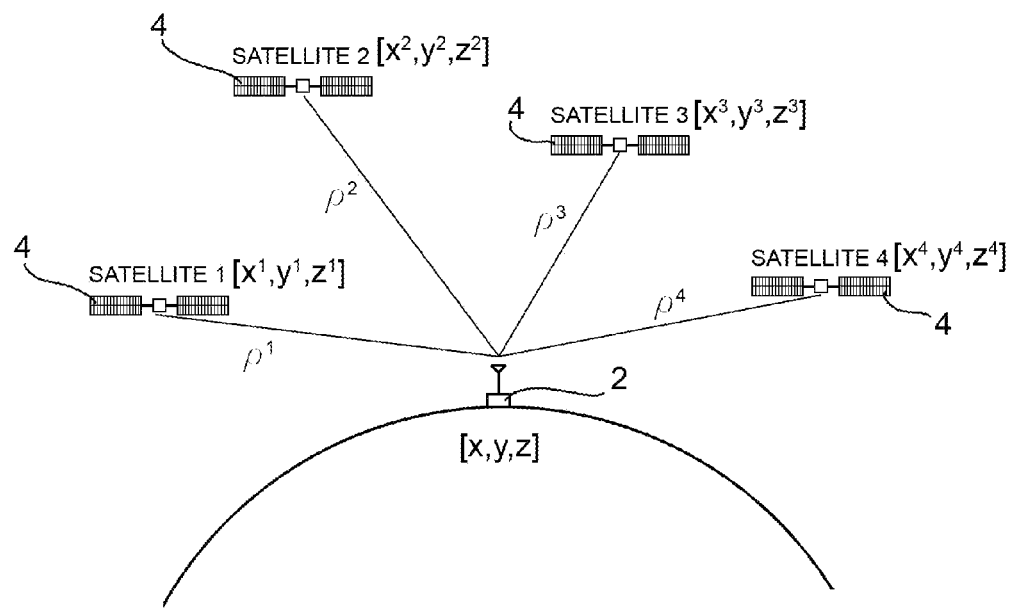
FIG. 2 depicts a GNSS receiver and four satellites of a satellite constellation of the GNSS.

The present invention stems from the following observation. GNSS receivers perform well in presence of Line of Sight (LOS) signals, that is signals emitted by a satellite and propagating directly to the receiver, without experiencing reflections and/or diffractions by external elements, such as buildings. In a real environment, GNSS receivers rarely rely on LOS signals; more often, they have to deal with replicas of the signals emitted by the satellite, generated by the interaction of the signals with the real environment. Each replica experiences a certain number of reflections and/or attenuations, thus reaching a receiver with its own amplitude. Furthermore, each signal replica reaches the receiver after propagating along a particular path, therefore with its own delay with respect to the emission time of the signal, so positively or negatively interfering with other replicas at the receiver side. This phenomenon is known as multipath interference and causes a degradation of the received signals additional to the proper propagation attenuation, so leading to a reduction of the receiver performances.

From a practical point of view, the receivers have to manage in an efficient manner replicas having different delays, so as to extract the information associated with the signals emitted by the satellites. Furthermore, generally the receivers receive signals from different satellites, and the multipath phenomenon affects all the communications established between the receivers and the satellites. However, signals emitted by different satellites are affected by the multipath interferences to different extents, and as a consequence, the communications with the satellites have different degrees of reliability.

The idea underlying the present invention is to compute the degradations experienced by the received satellite signals and due to the multipath interference, and then to compute the weight matrix based on the computed degradations.

Computation methodology for the entries of the weight matrix $\underline{W}$ according to the present invention will be hereinafter described in detail, which computation may be performed by a programmed processor at either the receiver 2 or the local element 3 charged with the computation of the estimated receiver position.

The following equation system corresponds to the equation system (7) with the provision of the proposed weight matrix $\underline{W}$:

$$\underline{\hat{X}} = (\tilde{G}^T \cdot \underline{W} \cdot \tilde{G})^{-1} \cdot \tilde{G}^T \cdot \underline{W} \cdot \underline{y} \tag{8}$$

The degradations of the received satellite signals due to their propagation in a real, multipath-affected environment, such as a urban street or, more in general, so-called urban canyons, rather than in an ideal, substantially multipath-free environment, such as an environment where the receiver receives only LOS signals, are determined by means of known techniques. For example, the degradation of a received satellite signal may be computed by subtracting either the overall attenuation (expressed in dB) experienced by the satellite signal in the substantially multipath-free environment from the overall attenuation (expressed in dB) experienced by the satellite signal in the multipath-affected environment or the power (expressed in dB) of the received satellite signal measured by the receiver in the multipath-affected environment from the power (expressed in dB) of the received satellite signal measured by a receiver in the substantially multipath-free environment. Additionally, as the signal power is generally measured in terms of Carrier-to-Noise Ratio (CNR), that is as the ratio C/N between the average received modulated carrier power C and the average received noise power N after the receiver filters, the signal degradation may be conveniently computed as the subtraction between the signal CNR (expressed in dB) measured in the real environment and the signal CNR (expressed in dB) measured in the ideal environment.

After the signal degradations have been computed, a statistical data processing is performed as described herebelow in detail to determine quantities indicative of the quality of the received signals.

Figure 3:
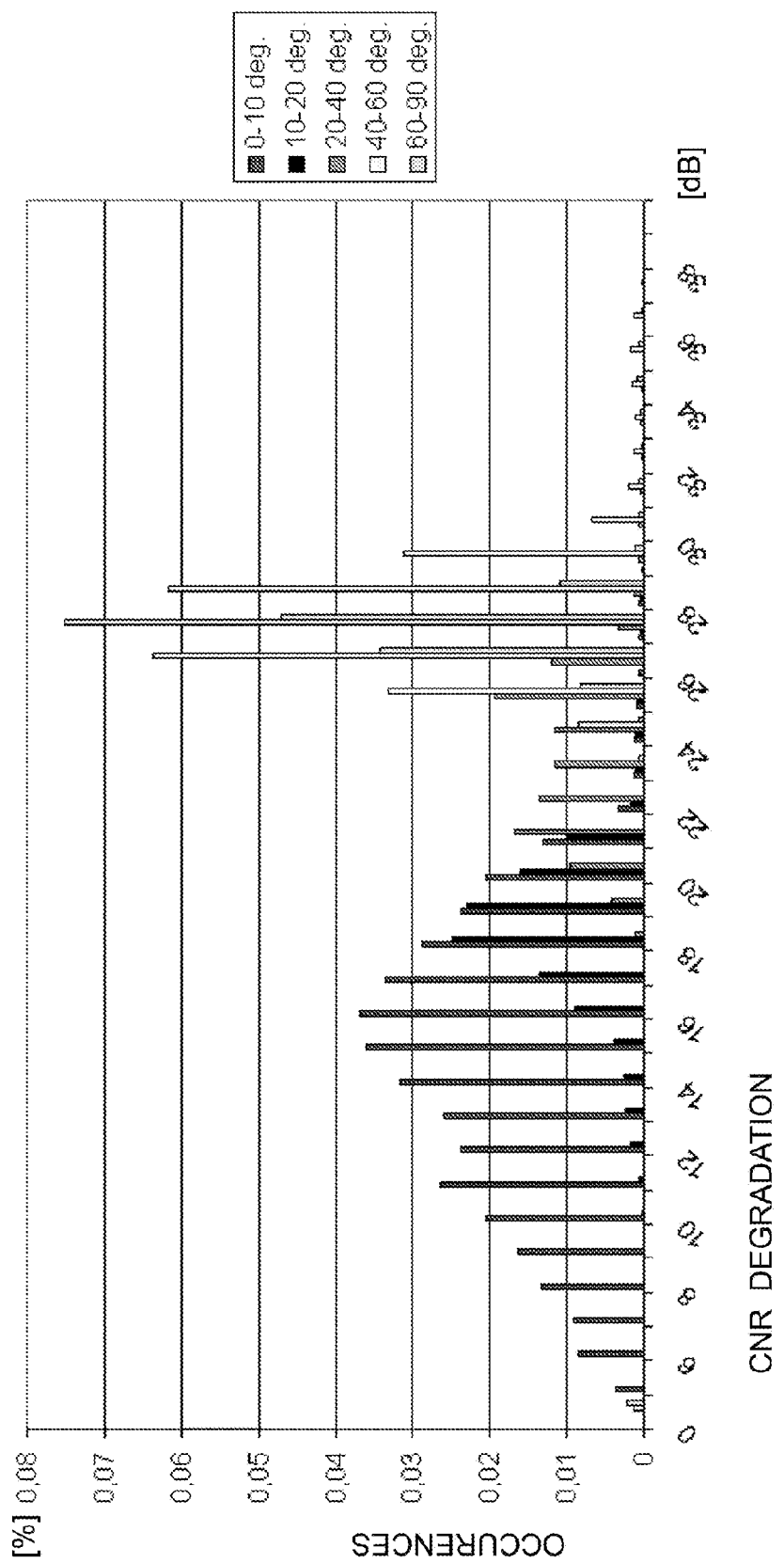
FIG. 3 shows an histogram according to the present invention.

In particular, for each satellite the following data, hereinafter referred to as satellite data, are available: the satellite pseudorange, the degradation of the signals emitted by the satellite, and the satellite azimuth and elevation. An histogram of the type shown in FIG. 3 is hence computed based on the satellite data. More in detail, the signals received by the receiver are first classified into a number M of different elevation classes based on the elevation of the satellite that has emitted the signals.

For each elevation class, the signals belonging to the elevation class considered are then further classified into a number A of different degradation classes, which are common to all elevation classes, based on the corresponding computed degradations. The widths of the elevation and degradation classes can be arbitrarily chosen. In the histogram shown in FIG. 3, the degradation classes are indicated on the abscissa axis, while the cardinality of each degradation class, namely the number of signals with degradations falling within each degradation class, is indicated in the ordinate axis, as a percentage with respect to all the received signals. In the example shown in FIG. 3, the elevation classes are in number of five (M=5), and are respectively associated with the following elevation degree ranges: 0-10, 10-20, 20-40, 40-60, 60-90.

Figure 4:
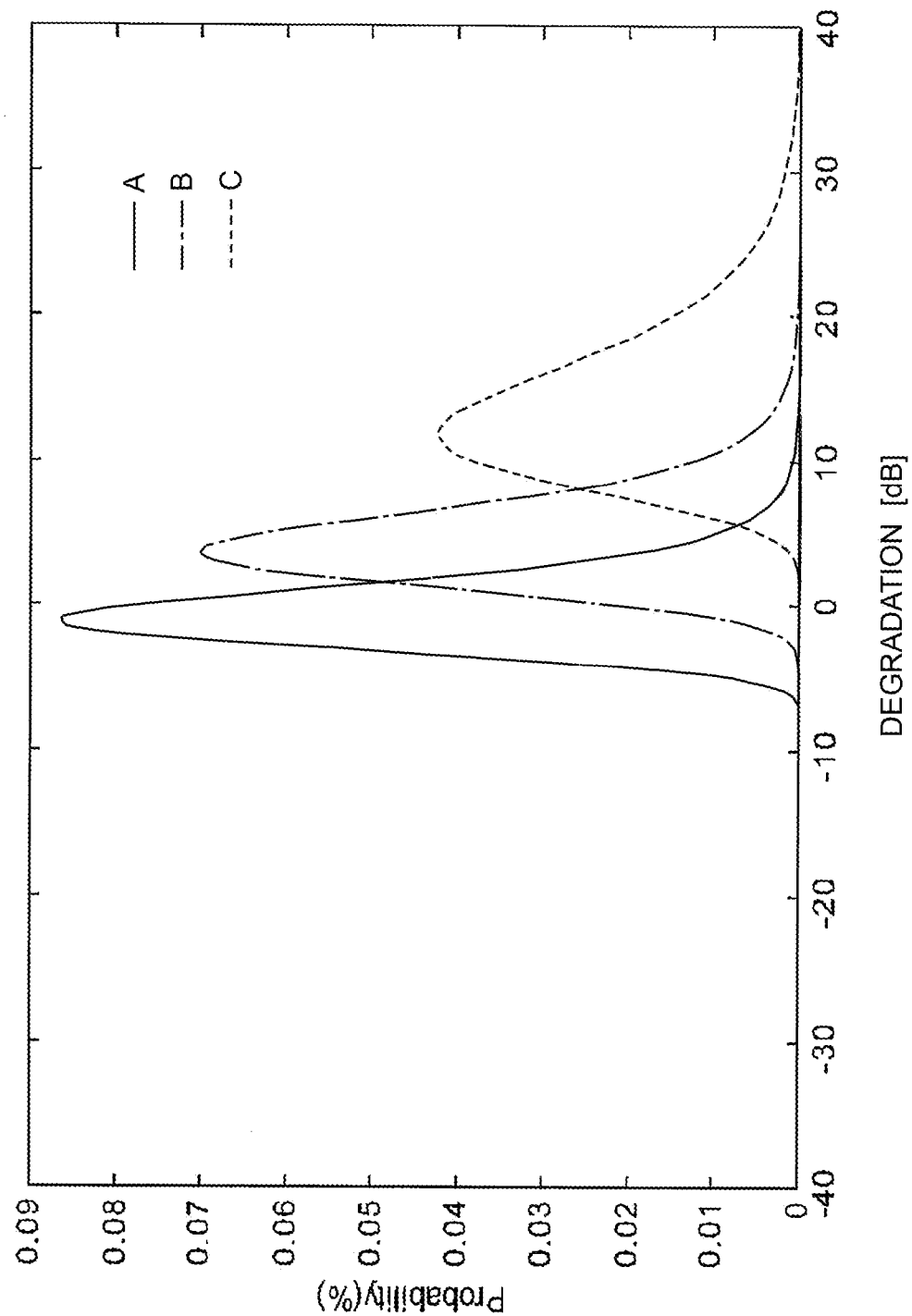
FIG. 4 shows a Rice, a Rayleigh and a Loo probability density functions.

For each elevation class, the distribution along the abscissa axis of the corresponding numbers of signals with degradations falling within the corresponding degradation classes is globally fitted with a plurality of different distribution functions, in the example considered in number of three, known in literature, conveniently the known Rice, Rayleigh and Lao distribution functions shown in FIG. 4 and each defined, among other things, by respective parameters, such as mean and variance. The skilled person may immediately appreciate that other distributions can be used, but in the following description reference will be made to the Rice, Rayleigh and Loo distributions.

The choice of these three distribution functions is due to the following. When a signal emitted by a satellite experiences multipath interferences, the attenuations of the received signals may be modeled with a Rice distribution:

$$f_{ricean}(v) = 2Kv \exp[-K(v^2+1)] I_0(2\mu K)$$

wherein v is the amplitude of the received LOS signal, K is power ratio between the LOS signal and a signal generated by multipath interferences, and $I_0$ is the Bessel function of order 0.

Instead, when a signal emitted by a satellite cannot reach the receiver directly, and hence the receiver receives just signals generated by multipath interferences, the attenuations of the received signals follow the Rayleigh distribution, which is a particular case of the Rice distribution:

$$f_{Rayleigh}(v) = 2Kv\exp[-Kv^2]$$

wherein v, K and $I_0$ have the same meaning as in the Rice distribution.

Finally, when a signal emitted by a satellite is received directly by the receiver, after having experienced attenuations due to materials such as leaves, the signal is said "shadowed", the attenuation of the received signal may be modelled with the Loo distribution:

$$f_{Loo}(v) = \sqrt{\frac{2}{\pi}} \frac{Kv}{\sigma} \int_0^\infty \frac{1}{z} \exp\left(-\frac{(\log(z)-m)^2}{2\sigma^2} - k(v^2 + z^2)\right) I_0(2Kvz) dz$$

wherein v, K and $I_0$ have the same meaning as in the Rice distribution, whereas m is the mean of the attenuations and σ is the standard deviation.

It has to be noted that the Loo distribution comprises two components: one corresponding to the attenuated LOS signal, following a lognormal distribution, and one corresponding to multipath interferences, following a Rayleigh distribution.

Figure 5:
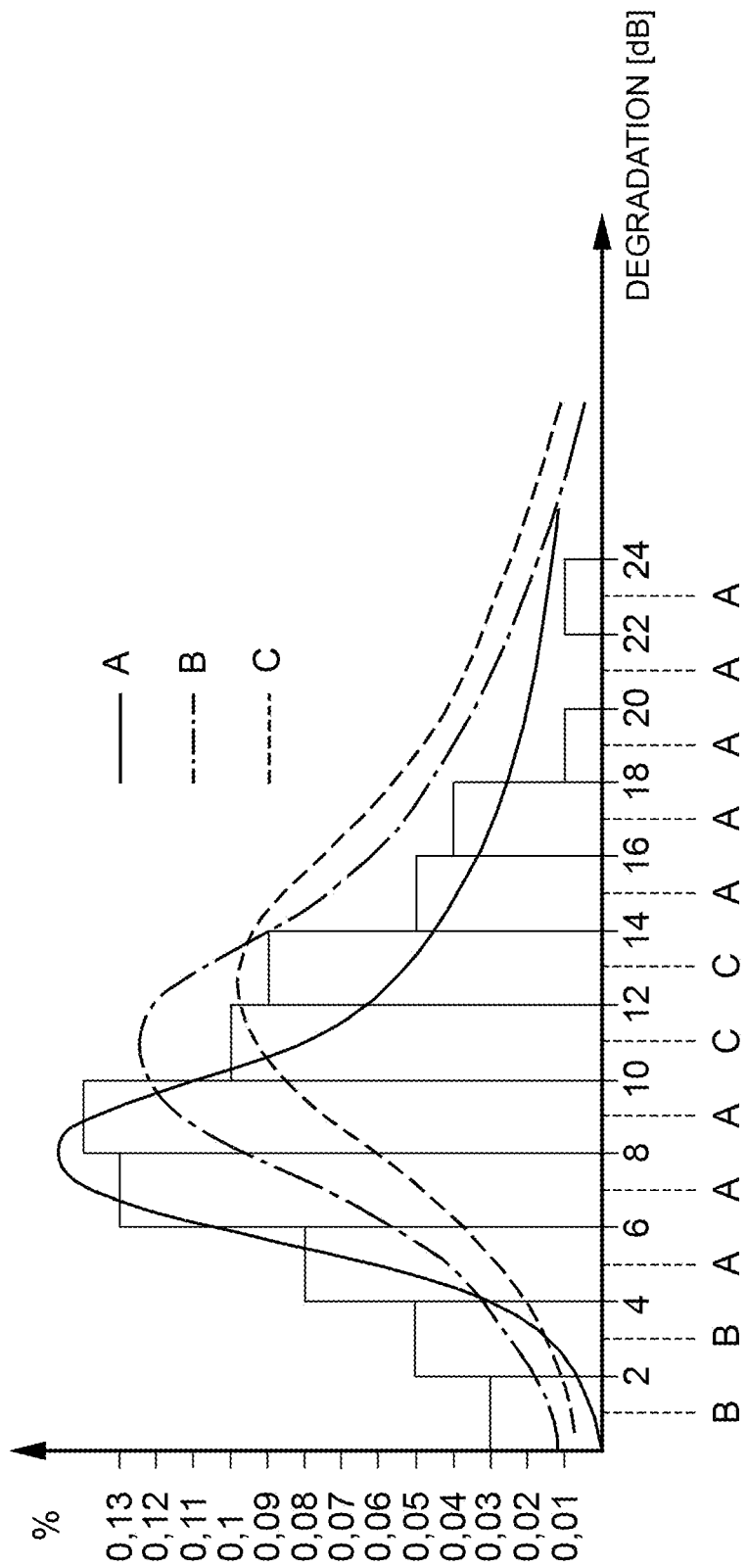
FIG. 5 shows qualitatively the distribution of degradations in an elevation class according to the present invention, and corresponding fitting distribution functions, index array and degradation intervals according to the present invention.

Then, for each degradation class in each elevation class, one of the three corresponding fitting distribution functions is associated which best fits, namely is closer to the number of signals with degradations falling within the corresponding degradation class. As shown in FIG. 5, this processing leads to the formation of an array of indexes for each elevation class, wherein each index is associated with a corresponding degradation class and is indicative of the best fitting distribution function for such a degradation class.

Then, in each array of indexes, subsequent groups of indexes are identified, wherein each group contains only equal indexes, and consecutive groups of indexes contain different indexes. Each group of equal indexes thus identifies a corresponding group of consecutive degradation classes which are fitted by one and the same best fitting distribution function, each group of degradation classes being hereinafter referred to as degradation interval.

At the end of this process, for each elevation class and each degradation interval a corresponding best fitting distribution function is identified, which has, among other things, an its own variance.

Then, a look-up table is constructed based on the identified groups of indexes, wherein the look-up table has a number of rows equal to the number H of elevations classes, and a number of columns equal to the number L of degradation intervals. In particular, each row is associated with a corresponding elevation class, each column is associated with a corresponding degradation interval, and each lookup entry is related to a parameter of the best fitting distribution function associated with the corresponding elevation class and degradation interval. Conveniently, each look-up entry is related, preferably substantially equal (short of minor adjustments), to the reciprocal of the variance of the corresponding best fitting distribution function. FIG. 6 shows a look-up table corresponding to the example shown in FIG. 3, namely with five rows and eight columns. It may be appreciated that in the look-up table the degradation intervals (columns) are common to all the elevation classes (rows). However, in general different elevation classes may be associated with different degradation intervals, so leading to a lookup table wherein the columns are not common to all the rows, but each row is associated with its own columns, which may be either equal or different from the columns associated with the other rows, either in number or in the degradation intervals associated therewith, or both.

In the end, the aforementioned weight matrix W is computed based on the formed lookup table, wherein the weight matrix W is a square matrix with a number of rows and columns equal to the number N of satellites "seen" by the receiver. Preferably, the weight matrix W is diagonal, wherein each diagonal entry is set equal to the entry of the lookup table corresponding to the elevation of the satellite associated with the diagonal entry and the degradation of a received signal, or a group of signals, emitted by such a satellite. The other non-diagonal entries may be either equal to zero, whereby the weight matrix W is pure diagonal, or negligible compared to the diagonal entries, whereby the weight matrix W is pseudo- or quasi-diagonal.

From a practical point of view, the weight matrix W assigns to each of the aforementioned satellite data, and in particular to each pseudorange, a corresponding weight related to the elevation of the satellite and the degradation of the corresponding received signals, so as to overweight those satellite data contained in received signals which are less affected by multipath phenomenon and hence less degraded and with a lower statistical dispersion, and to underweight the others.

Extensive computer simulations proved that the adoption of the present invention allows the receiver position estimation accuracy to be markedly enhanced compared to commercially available satellite receivers that either do not implement any weighting at all or implement different weighting approaches, as summarized in terms of topocentric errors of the position coordinates in the table shown in FIG. 7.

Finally, it is clear that numerous modifications and variants can be made to the present invention, all falling within the scope of the invention, as defined in the appended claims.

In particular, the histogram may be computed based on the degradations of signals received in an appropriate time span by several receivers located in multipath-affected environments, the time span being equal, as an example, to the satellite constellation orbit period, thereby improving the accuracy of the variance computation and, as a consequence, the receiver position estimation.

Furthermore, the lookup table may be computed either statically or dynamically, namely updated periodically, by means of a periodic survey, and stored in a database. This latter solution may be advantageously employed in an assisted GNSS including assistance servers in the local elements where such a database may be hosted.

Additionally, the weights are sent to the receiver according to the receiver position, preferably upon emission of an assistance request by the receiver. In this case, the assistance request comprises a rough estimation of the receiver position, so as to allow the assistance server to scan the database and extract the proper weights, which are sent back to the receiver. Conversely, the extracted weights may be directly used by the assistance server to compute the receiver position.

The invention claimed is:

1. Method of estimating a position of a satellite receiver, comprising:
   computing a weight matrix; and
   computing, by a programmed processor, an estimated position of the satellite receiver based on the weight matrix;

characterized in that computing the weight matrix includes:

computing quantities indicative of degradations experienced by satellite signals and due to multipath interference;

computing the weight matrix based on the computed quantities; and wherein computing the weight matrix includes:

classifying received signals into elevation classes based on elevations of the satellites that have emitted the signals;

for each elevation class, classifying the signals belonging to the elevation class into degradation classes based on the corresponding degradations, each degradation class having a corresponding cardinality defined by the number of signals with degradations falling within the degradation class;

for each elevation class, identifying different distribution functions which globally fit the distribution of the corresponding numbers of signal with degradations falling within the corresponding degradation classes;

for each elevation class, associating each degradation class with one of the corresponding distribution functions that satisfies a given criterion in relation to the number of signals with degradations falling within the corresponding degradation class; and computing the weight matrix based on quantities related to parameters of the distribution functions associated with the degradation classes.

2. The method of claim 1, wherein the weight matrix includes weight entries each associated with a corresponding satellite, and wherein computing a quantity indicative of a degradation experienced by satellite signals from a corresponding satellite and due to multipath interference includes:

measuring a quantity indicative of an attenuation experienced by a satellite signal in a substantially multipath-free environment;

measuring a quantity indicative of an attenuation of a satellite signal in a multipath-affected environment; and computing the quantity indicative of the degradation based on the measured quantities.

3. The method of claim 1, further including:

for each elevation class, identifying groups of consecutive degradation classes associated with the same distribution function.

4. The method of claim 1, wherein the weight matrix includes diagonal entries each associated with a corresponding satellite, and wherein computing the weight matrix based on quantities related to parameters of the distribution functions associated with the degradation classes includes:

computing each diagonal entry of the weight matrix based on a quantity related to a parameter of the distribution function associated with the degradation class containing the degradations of signals from the corresponding satellite, and the elevation class containing the elevation of the corresponding satellite.

5. The method of claim 1, wherein the parameter of the distribution function is the variance of the distribution function, and the quantity related to the parameter is the reciprocal of the variance.

6. The method of claim 1, wherein the different distribution functions include Rice, Rayleigh, and Loo distribution functions.

7. The method of claim 1, wherein the quantities indicative of degradations due to multipath interference are computed based on satellite signals emitted in a given time span.

8. The method of claim 1, wherein computing an estimated position of the satellite receiver based on the weight matrix includes:

computing iteratively the following equation system:

$$\hat{\underline{X}} = (\tilde{\underline{G}}^T \cdot \underline{W} \cdot \tilde{\underline{G}})^{-1} \cdot \tilde{\underline{G}}^T \cdot \underline{W} \cdot \tilde{\underline{y}}$$

wherein:

$\hat{\underline{X}}$ is a vector indicative of the estimated satellite receiver position;

$\underline{W}$ is the weight matrix;

$\tilde{\underline{G}}$ is a matrix with a number of rows equal to the number N of satellites the signals emitted thereby are received by the satellite receiver, each row being associated with a corresponding satellite and being in the form [cos $El_i$ cos $Az_i$ cos $El_i$ cos $Az_i$ sin $El_i$ 1], wherein $El_i$ and $Az_i$ are, respectively, the elevation and the azimuth of the corresponding satellite;

$\tilde{\underline{G}}^T$ is the transpose of the matrix $\tilde{\underline{G}}$; and $\tilde{\underline{y}}$ is a vector with N entries each associated with a corresponding satellite the signals emitted thereby are received by the satellite receiver, each entry being equal to the difference between a corresponding computed satellite pseudorange and a computed geometrical distance between the satellite receiver and the corresponding satellite.

9. A satellite navigation system including a satellite constellation, a ground local element configured to communicate with the satellites, and a satellite receiver configured to communicate with the satellites and the ground local element; characterized by a system for estimating a position of the satellite receiver configured to implement the method according to claim 1.

10. The system of claim 9, wherein the system for estimating the position of the satellite receiver is comprised in the satellite receiver.

11. The system of claim 9, wherein the system for estimating the position of the satellite receiver is comprised in the ground local element.

* * * * *

UNITED STATES PATENT AND TRADEMARK OFFICE
CERTIFICATE OF CORRECTION

PATENT NO. : 8,508,406 B2  Page 1 of 1
APPLICATION NO. : 12/933279
DATED : August 13, 2013
INVENTOR(S) : Rodriguez et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 402 days.

Signed and Sealed this

Fifteenth Day of September, 2015

Michelle K. Lee
*Director of the United States Patent and Trademark Office*